INVENTOR.
BRIAN W. HOWALD

BY John Howard Swift

ATTY.

United States Patent Office 3,339,080
Patented Aug. 29, 1967

3,339,080
DC-AC OR AC-DC CONVERTER
Brian W. Howald, Amherst, Ohio, assignor to Lorain Products Corporation, a corporation of Ohio
Filed June 24, 1964, Ser. No. 377,680
4 Claims. (Cl. 307—66)

ABSTRACT OF THE DISCLOSURE

A circuit for inverting DC from a DC supply battery to AC including a solid state oscillator including two transistors. The circuit charges the battery when the circuit is connected to an AC source such as line power. A relay and a bank of contacts is provided to predetermine whether the circuit operates in the inverter, load supply mode or the charging mode. In the absence of AC line supply the relay is deenergized and a contact is made to complete circuitry from the output, secondary winding of the battery-oscillator system to the load to supply AC thereto. Connection of the circuit to AC line power energizes the relay to open the above contact and close others to connect AC line to the battery, through the transistors which, acting as diodes, rectifies the AC to supply charging DC power to the battery.

This invention relates to power supply units and is directed more particularly to circuitry which is adapted to change direct current into alternating current or to change alternating current into direct current.

In the past where it was necessary to operate equipment, as for example, power saws, drills or other equipment requiring 115 volt, 60 cycle power at a location such as a construction site where no line power was available, such power was usually provided by suitable engine driven generators. With the advent of transistors, and especially power transistors, the problem of supplying 115 volt, 60 cycle power was greatly simplified by the introduction of transistorized inverter circuits which operate from a battery to supply the required AC power. These inverters are efficient, compact and easily portable. However, a battery charger must now be provided at a location where line power is available so that the inverter unit containing the battery may be taken to this location in order to recharge the battery. It will be seen that if the battery charger were not required, the cost of this relatively expensive unit would be saved.

Accordingly, it is an object of the invention to provide circuitry which supplies alternating current to a load when energized from a battery and which supplies current to recharge the battery when energized from a source of alternating current.

It is another object of the invention to provide circuitry which may be operated in a switching mode to change direct current supplied from the battery into alternating current or which may be operated in a rectifying mode to change alternating current into a direct current to recharge the battery.

It is a further object of the invention to provide circuitry which in a first mode of operation produces a time varying voltage on the primary winding of a transformer by the on-off conducting activity of semiconductor means connected between the battery and the primary winding to produce alternating current in the secondary winding of the transformer and which, when alternating current is applied to the secondary winding of the transformer, utilizes the semiconductor means to rectify current flowing between the primary winding of the transformer and the battery so that the battery may be recharged.

Still another object of the invention is to provide circuitry which includes a mode selecting means having a plurality of fixed and movable contacts by which the secondary winding of a transistor oscillator power transformer is normally connected to a load but which, when AC power is supplied thereto, causes the base and emitter electrodes of the transistors to be connected together and also causes the alternating current source to be connected to the load and to the secondary winding of the transistor oscillator power transformer.

Figure 1:
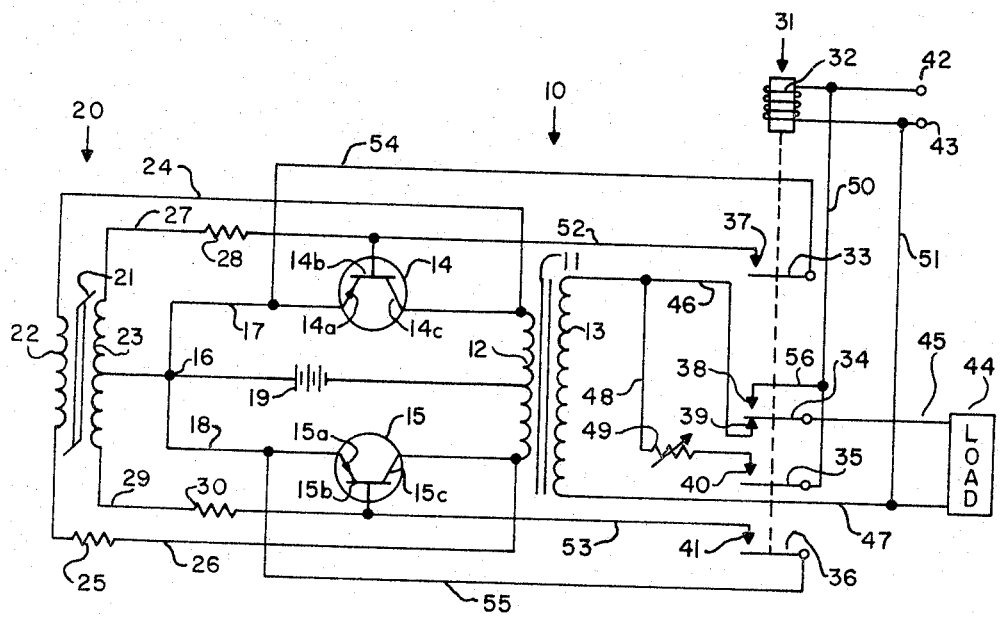
Figure 2:
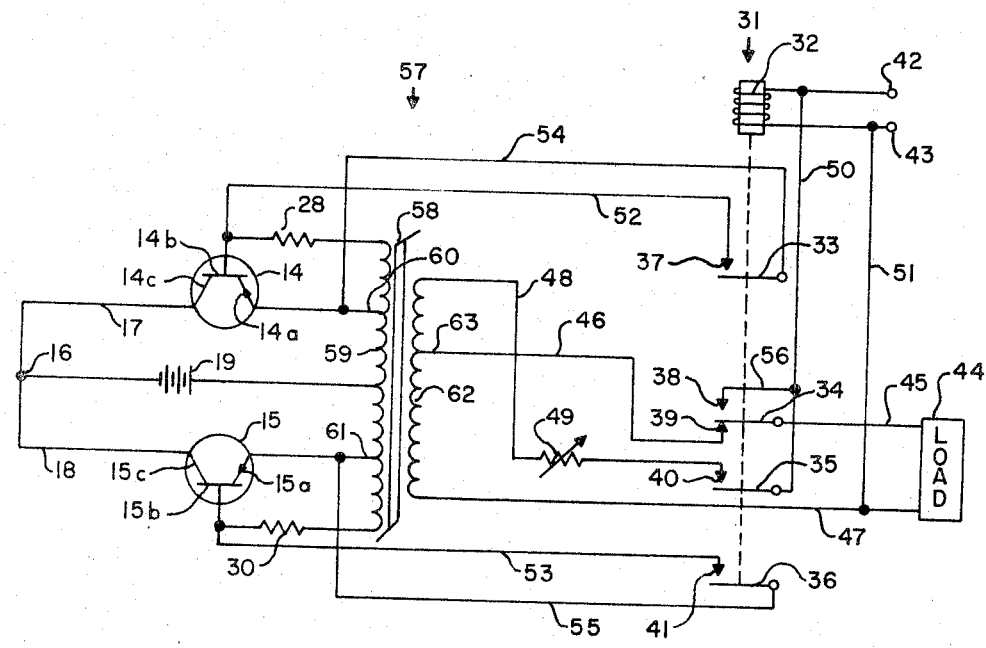

Other objects and advantages of the invention will become apparent from the following description and accompanying drawings in which:

FIGURE 1 is a schematic representation of the circuitry embodying the invention, and FIGURE 2 is a schematic diagram showing circuitry embodying the invention modified with respect to the transformer unit.

Referring to FIGURE 1, it will be seen that circuitry embodying the invention may include a power transformer 10 having a core 11 with a center tapped primary winding 12 and a secondary winding 13 carried thereon. In order to produce an alternating current in the primary winding 12, there is provided a pair of P-N-P type transistors having emitter electrodes 14a and 15a, base electrodes 14b and 15b and collector electrodes 14c and 15c, respectively. For the purpose of establishing current paths for the transistors 14 and 15, the collector electrodes 14c and 15c are connected to opposite ends of the primary winding 12 and the emitter electrodes 14a and 15a are connected to a junction 16 through leads 17 and 18, respectively. A suitable battery 19 which has a positive terminal connected to the junction 16 and a negative terminal connected to the center tap of the primary winding 12 supplies current to the primary winding 12. It will be understood, of course, that N-P-N type transistors may be substituted for the P-N-P types described herein if the polarity of the battery 19 is reversed. From the foregoing it will be seen that when transistor 14 conducts, the upper half of primary winding 12 will be energized by the DC source 19 and when transistor 15 conducts, the lower half of the primary winding 12 will be energized from the DC source 19.

To the end that the transistors 14 and 15 may be rendered alternately conducting whereby an alternating current will traverse the primary winding 12 and the secondary winding 13 of the power transformer 10, there is provided a feedback transformer 20 having a saturable core 21 with a primary winding 22 and a center tapped winding 23 carried thereon. The upper end of the primary winding 22 of the transformer 20 is connected to the upper end of the primary winding 12 of transformer 10 through a lead 24 while the lower end of the primary winding 22 is connected to the lower end of the primary winding 12 through a resistor 25 and a lead 26. These connections apply the alternating voltage developed across the primary winding 12 of the power transformer 10 to the primary winding 22 of the feedback transformer 20.

The bias voltage necessary to control the conduction of the transistors 14 and 15 is applied to the base electrode 14b from the upper end of secondary winding 23 of the feedback transformer 20 through a lead 27 and a voltage dropping resistor 28 and to the base electrode 15b from the lower end of secondary winding 23 to a lead 29 and a voltage dropping resistor 30. The feedback circuit for the transistors 14 and 15 is completed by connecting the center tap of the secondary winding 23 to the junction 16. Each half of the secondary winding 23 serves as drive or activating means for the transistor associated therewith.

The foregoing described connections establish a transistor oscillator circuit of the type having a saturable feedback transformer. Such circuits are relatively wellknown and therefore the operation of the transistor oscillator utilized in the circuitry embodying the invention will be described only briefly herein. Assuming that the transistor 14 conducts first when the voltage of the DC source 19 is applied between the junction 16 and the center tap of the primary winding 12 of the power transformer, the upper end of the primary winding 12 will be positive with respect to the lower end thereof. Similarly, the upper end of the primary winding 22 of the feedback transformer 20 will be positive with respect to the lower end causing a negative voltage to be applied to the base electrode 14b of transistor 14.

The conduction of the transistor 14 will increase until the core 21 of the feedback transformer 20 saturates causing the forward bias to be removed from this transistor. When this happens, transistor 14 begins to turn off and the polarity of the voltages on the primary winding 12 and the primary winding 22 of transformers 10 and 20, respectively, reverses thereby causing forward bias to be applied to the transistor 15. Transistor 15 will then increase in conduction until the core 21 of the feedback transformer saturates. The foregoing switching activity of the transistors 14 and 15 produces an alternating current flow in the primary winding 12 of the power transformer 10 and consequently an alternating voltage is induced on the secondary winding 13 of the power transformer 10.

In a first mode of operation the circuitry embodying the invention supplies alternating current to a load while in a second mode of operation the circuitry receives alternating current from a suitable source, as for example AC line power, and provides direct current output which may be used to recharge the battery from which the circuitry was operated in the first mode of operation. To this end there is provided a relay 31 having a winding 32, a plurality of movable contacts 33, 34, 35 and 36 and a plurality of fixed contacts 37, 38, 39, 40 and 41.

The relay winding 32 is connected to a pair of input terminals 42 and 43 so that the second mode of operation will occur when a suitable source of alternating current power is connected to these terminals causing the movable contacts to move upwards as viewed in the drawing to complete connections which will be described presently. It will be understood that manual operation of the relay 31 may be accomplished by any suitable mechanism which provides simultaneous movement of the movable contacts. If such mechanism is utilized the winding 32 may be eliminated. The relay 31 may be considered as mode selecting means which is in a first position when the movable contacts are down or released and in a second position when the movable contacts are pulled up.

Operation of the circuitry in the first mode will now be explained. Assuming that the relay 31 is de-energized, the movable contact 34 which is connected to a suitable load 44 through a lead 45 is positioned against fixed contact 39 which is connected through a lead 46 to the upper end of the secondary winding 13 of the power transformer 10. A circuit for current flow from the secondary winding 13 to the load 44 is completed by a lead 47 connected between the lower end of the secondary winding 13 and the lower end of the load 44, as shown. When the upper end of the secondary winding 13 is positive with respect to the lower end, current will flow through lead 46, contact 39, movable contact 34 and lead 45 to the load, returning to the lower end of the secondary winding 13 through the lead 47. Upon reversal of the polarity the current will flow from the lower end of the secondary winding 13 through lead 47 to the load 44 and will be returned to the upper end of the secondary winding 13 through lead 45, movable contact 34, contact 39 and the lead 46. Since the fixed contact 39 is utilized to connect the secondary or output winding 13 to the load in the first mode of operation it may be termed an output contact. Thus when the relay 31 is de-energized the alternating current developed in the secondary winding 13 of the power transformer 10 by the switching activity of the transistors 14 and 15 is directed to the load 44.

During the second mode of operation suitable alternating current power must be supplied to the secondary winding 13 of the power transformer 10 and, additionally, transistors 14 and 15 must be modified to function as rectifiers or unidirectional conducting means so that a DC voltage will be developed between the junction 16 and the center tap of the primary winding 12 of the power transformer 10 as a result of the AC supplied to the primary winding. In order that the alternating current power applied to the AC input terminals 42 and 43 will be directed to the secondary winding 13 of the power transformer 10, the upper end of the secondary winding 13 is connected to a contact 40 of the relay 31 through a lead 48 and a variable resistor 49 or charge rate adjusting means, the movable contact 35 of the relay 31 is connected to the AC input terminal 42 through a lead 50 and, the lead 47 which connects the secondary winding 13 and the load is connected to the AC input terminal 43 by means of a lead 51.

To the end that the transistors 14 and 15 will be modified to function as rectifiers when AC power is applied to the terminals 42 and 43, the base electrodes 14b and 15b are connected to the contacts 37 and 41 through leads 52 and 53, respectively, and the emitter electrodes 14a and 15a are connected to the movable contacts 33 and 36 by means of leads 54 and 55, respectively. Because of the nature of the P-N-P type transistors 14 and 15, current can flow in each from the emitter electrode to the collector electrode through the base electrode. However, current cannot flow from the collector electrode to the emitter electrode in a P-N-P type transistor because, although the current can flow from the collector to the base, it cannot flow from the base electrode to the collector electrode. As will be seen presently, when the movable contact 33 is positioned against the contact 37, a current path is established in parallel with the base-emitter electrodes of the transistor 14. In a like manner the contact 41 and the armature 36 provide a shunt current path around the base-emitter junction of the transistor 15.

The circuitry of the invention is completed by a lead 56 connecting the contact 38 to the lead 50. As explained previously, when the movable contact 34 is positioned against the contact 39, the load 44 is connected across the secondary winding 13 of the power transformer 10. However, when the relay 31 is energized, the movable contact 34 will be pulled up against the contact 38 and the load 44 will be accordingly connected to the AC input terminal 42 by means of the lead 45, the movable contact 34, the contact 38, the lead 56 and the lead 50 and to the AC input terminal 43 through the lead 51. This arrangement permits the load 44 to be operated from the AC power while the battery 19 is being recharged.

The operation of the circuitry in the second mode will now be described. When suitable AC power is applied to the terminals 42 and 43 and, consequently, to the relay winding 32, the movable contacts 33, 34, 35 and 36 are all pulled up into position against the respective fixed contacts 37, 38, 40 and 41. Assuming that the terminal 42 is positive with respect to the terminal 43, current will flow from the terminal 42 through lead 50, movable contact 35, the contact 40, the variable resistor 49 and the lead 48 to the upper end of a secondary winding 13 of the power transformer 10. This current then flows downwardly through the secondary winding 13 and through leads 47 and 51 to the input terminal 43. The downward current flow through the secondary winding 13 causes the upper end of the center tapped primary winding 12 to be positive with respect to the lower end. This polarity causes current to flow from the upper end of primary winding 12 through the collector electrode 14c and the base electrode 14b of transistor 14, through lead 52, contact 37, the movable contact 33, the lead 54 and the lead 17 to the junction 16 from which it flows to the positive side of the battery 19. Current then flows from the negative side of the battery 19 to the center tap of the primary winding 12. Thus it will be seen that when the AC input terminal 42 is positive with respect to terminal 43, the transistor 14 functions as a rectifier so that the battery 19 may be recharged by current supplied from the primary winding 12.

On the alternate half cycle of the AC input the terminal 43 will be positive with respect to the terminal 42 and current will flow from the terminal 43 through lead 51, lead 47, the secondary winding 13, the lead 48, the variable resistor 49, the contact 40, the movable contact 35 and lead 50 to the terminal 42. The resulting polarity induced on the primary winding 12 by this current flow in the secondary winding 13 causes the lower end of the primary winding 12 to be positive with respect to the upper end. Consequently, current will flow from the lower end of the primary winding 12 through the collector electrode 15c and the base electrode 15b of the transistor 15, through lead 53, the contact 41, the movable contact 36, the lead 55 and the lead 18 to the junction 16. From junction 16 current flows to the positive side of the battery 19 and returns to the center tap of primary winding 12 from the negative side of the battery. Thus when the AC input terminal 43 is positive with respect to the terminal 42, the transistor 15 serves as a rectifier in order that charging current will be supplied to the battery 19.

The circuit shown in FIGURE 2 is similar to that shown in FIGURE 1 and like parts have like numerals. In the circuit of FIGURE 2 there is provided a transformer 57 having a saturable core 58. A primary winding 59 having a center tap and lateral taps 60 and 61 on each side thereof, and a secondary winding 62 having a tap 63 are carried on the saturable core 58. The winding section between the tap 60 and the upper end of the primary winding 59 provides drive for transistor 14 and the section between tap 61 and the lower end of the primary winding 59 supplies drive for transistor 15. The connectons of the emitter and collector electrodes of transistors 14 and 15 have been interchanged in the circuit of FIGURE 2 and the polarity of the battery 19 has also been reversed.

In the circuit of FIGURE 1, the load 44 is connected across secondary winding 13 in the first mode of operation and the AC power is applied to this winding in the second mode of operation. However, in the circuit of FIGURE 2 the core 58 may saturate allowing excessive and destructive input current to flow if AC power is applied to the same number of secondary turns used to supply current to the load in the first mode of operation.

This saturating of core 58 may be avoided by providing the secondary winding with extra turns to be utilized in the second mode of operation. To this end the contact 39 is connected to the tap 63 on the secondary winding 62 and the contact 40 is connected to the upper end of the secondary winding.

When the circuit of FIGURE 2 is operating in the first mode of operation, the transistors 14 and 15 produce AC voltage on the secondary winding 62. The portion of this voltage appearing between the tap 63 and the lower end of the secondary winding 62 is supplied to the load 44 through the contacts and leads previously described.

In the second mode of operation the AC power is applied to the whole secondary winding 62. The extra turns now being utilized on the secondary winding permits voltage and current to be developed on the primary winding 12 without saturation of the core 58. The transistors 14 and 15 rectify the current, as described previously, and the battery is thereby recharged.

From the foregoing it will be seen that there is provided circuitry which in a first mode of operation changes direct current into alternating current to operate devices which require such AC for operation. In a second mode of operation, the circuitry operates from an alternating current source and supplies direct current which may be used to recharge the battery from which the circuitry operated in the first mode of operation.

It will be understood that the embodiment shown herein is for explanatory purposes and may be changed or modified without departing from the spirit and scope of the invention as set forth in the claims appended hereto.

What I claim is:

1. In a circuit adapted to operate from a battery and supply AC to a load in a first mode of operation and to operate from an AC source and supply DC to the battery in a second mode of operation, in combination, a transformer having a saturable core with a tapped secondary and a center-tapped primary winding including first and second drive sections carried thereon, a positive terminal and a negative terminal adapted to be connected to the positive and negative terminals, respectively, of the battery, means for connecting the collector electrodes of said first and second transistors to said negative terminal, means for connecting said emitter electrode of said first transistor to a point between said primary winding and said first drive section, means for connecting said emitter electrode of said second transistor to a point between said primary winding and said second drive section, means for connecting said base electrode of said first transistor to said first drive section, means for connecting said base electrode of said second transistor to said second drive section, a relay including first, second, third and fourth movable contacts each having a fixed contact associated therewith, said fourth movable contact having additionally an output contact, means for connecting said first movable contact and said fixed contact associated therewith between said emitter electrode and said base electrode of said first transistor, means for connecting said second movable contact and said fixed contact associated therewith between said emitter electrode and said base electrode of said second transistor, means for connecting one end of said secondary winding to one side of the load and to one side of the AC source, variable resistance means, means for serially connecting said variable resistance means with said third movable contact and said fixed contact associated therewith between the other end of said secondary winding of the power transformer and the other side of the AC source, means for connecting said fourth movable contact and said fixed contact associated therewith between the other side of the load and said other side of the AC source, means for connecting said output contact to the tap of said secondary winding.

2. In a circuit adapted to operate from a DC battery and supply AC to a load in a first mode of operation and to operate from an AC source and supply DC to the battery in a second mode of operation, in combination, a power transformer having a center-tapped primary winding and a secondary winding, first and second transistors having emitter, base and collector electrodes, a positive terminal adapted to be connected to the positive pole of the battery, a negative terminal adapted to be connected to the negative pole of the battery, means for connecting said negative terminal to said center-tap of said primary winding, means for connecting the emitter electrodes of said first and second transistors to said positive terminal, first drive means connected between said emitter electrode and said base electrode of said first transistor, second drive means connected between said emitter electrode and said base electrode of said second transistor, variable resistive means, AC operated mode selecting means including first means for connecting said base electrode of said first transistor to said positive terminal, second means for connecting said base electrode of said second transistor to said positive terminal, third means for connecting said secondary winding to the AC source, said first, second and third means making said connections only when AC is supplied to said mode selecting means, fourth means for connecting the load to the AC source through said variable resistance means when AC is supplied to said mode selecting means and for connecting said secondary winding to said load when AC is not supplied to said mode selecting means.

3. In a DC to AC converter adapted to supply DC to a battery from an AC source in a second mode of operation, in combination, a power transformer having a center-tapped primary winding and a secondary winding, saturable feedback transformer having a primary winding and a center-tapped secondary winding, first and second transistors each having an emitter, a base and a collector electrode, means for commonly connecting one side of the battery, the center-tap of said secondary winding of said saturable feedback transformer and said emitter electrodes of said first and second transistors, first and second resistive means, means for connecting said base electrodes of said first and second transistors to opposite ends of said center-tapped secondary winding of said feedback transformer through said first and second resistive means, respectively, means for connecting the collector electrodes of said first and second transistors to opposite ends of said center-tapped primary winding of said power transformer, means for connecting the other side of the battery to said center-tap of said primary winding of said power transformer, means for connecting said primary winding of said feedback transformer in parallel with said center-tapped primary winding of said power transformer, a relay including first, second, third and fourth movable contact means each having a fixed contact associated therewith, said fourth movable contact means having additionally an output contact, means for connecting said first movable contact means and said fixed contact associated therewith between said emitter electrode and said base electrode of said first transistor, means for connecting said second movable contact means and said fixed contact associated therewith between said emitter electrode and said base electrode of said second transistor, means for connecting one end of said secondary winding of said power transformer to one side of the load and to one side of the AC source, variable resistance means, means for serially connecting said variable resistance means with said third movable contact means and said fixed contact associated therewith between the other end of said secondary winding of the power transformer and the other side of the AC source, means for connecting said fourth movable contact means and said fixed contact associated therewith between the other side of said load and the other side of the AC source, means for connecting said output contact to said other end of said secondary winding of said power transformer.

4. In a circuit adapted to operate from a DC source and supply AC to a load in a first mode of operation and to operate from an AC source and supply DC to the DC source in a second mode of operation, in combination, a saturable transformer having primary winding means and secondary winding means, drive means responsive to said saturable transformer, amplifying means having first and second power electrode means and control electrode means, means for connecting said first power electrode means to one side of the DC source, means for connecting said second power electrode means to the other side of the DC source through said primary winding means, means for connecting said drive means between said control electrode means and said first power electrode means, resistance means, mode selecting means including first means for connecting said first power electrode means to said control electrode means and second means for connecting said secondary winding to the AC source through said resistance means when said mode selecting means is in a second position, and third means for connecting said secondary winding to the load when said mode selecting means is in a first position.

References Cited
UNITED STATES PATENTS

| | | | |
|---|---|---|---|
| 2,263,320 | 11/1941 | Trucksess | 307—64 |
| 3,044,023 | 7/1962 | Floyd | 321—45 |
| 3,108,191 | 10/1963 | Bagno | 307—66 |
| 3,293,445 | 12/1966 | Levy | 321—45 X |

OTHER REFERENCES

Japanese application 36/4411, May 1961.

JOHN F. COUCH, *Primary Examiner.*

W. H. BEHA, *Assistant Examiner.*